United States Patent
Pan et al.

(10) Patent No.: US 7,443,572 B2
(45) Date of Patent: Oct. 28, 2008

(54) FAST-RESPONSE SPATIAL LIGHT MODULATOR

(75) Inventors: Shaoher X. Pan, San Jose, CA (US); Vlad Novotny, Los Gatos, CA (US); Xuchun Liu, Sunnyvale, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 189 days.

(21) Appl. No.: 11/297,162

(22) Filed: Dec. 7, 2005

(65) Prior Publication Data

US 2007/0127110 A1    Jun. 7, 2007

(51) Int. Cl.
G02B 26/08    (2006.01)

(52) U.S. Cl. .................................. 359/298; 359/291

(58) Field of Classification Search ................ 359/298, 359/292, 291, 295, 221, 222, 223, 224, 320
See application file for complete search history.

(56) References Cited

U.S. PATENT DOCUMENTS 6,825,968 B2 * 11/2004 Aubuchon ................ 359/290
6,856,068 B2 * 2/2005 Miller et al. ................ 310/311
6,880,936 B2 * 4/2005 Shin ............................ 353/99
6,987,601 B2 * 1/2006 Kaeriyama ................. 359/295
6,992,810 B2 * 1/2006 Pan et al. .................... 359/290
7,099,060 B2 * 8/2006 Nanjyo et al. .............. 359/198
2005/0128564 A1   6/2005 Pan
2007/0121191 A1   5/2007 Pan
2007/0121192 A1   5/2007 Lee et al.
2007/0132681 A1   6/2007 Chen
2007/0206265 A1   9/2007 Pan et al.

* cited by examiner

Primary Examiner—Hung X. Dang
Assistant Examiner—Tuyen Q Tra
(74) Attorney, Agent, or Firm—Fish & Richardson P.C.

(57) ABSTRACT

A spatial light modulator includes a mirror plate comprising a reflective upper surface, a lower surface, and a cavity having an opening on the lower surface; a substrate comprising an upper surface, a hinge support post in connection with the upper surface, and a hinge component supported by the hinge support post and in connection with the mirror plate; and a landing tip having a laterally extended upper portion and a vertically extended lower portion in connection with the substrate and the vertically extended lower portion. The laterally extended upper portion can contact the lower surface of the mirror plate to limit the rotation of the mirror plate. The hinge component extends into the cavity and can facilitate a rotation of the mirror plate.

10 Claims, 14 Drawing Sheets cross section view of a part of the spatial light modulator according to one embodiment of the present invention deflecting illumination to an "on" state.

cross section view of a part of the spatial light modulator according to one embodiment of the present invention deflecting illumination to an "off" state.

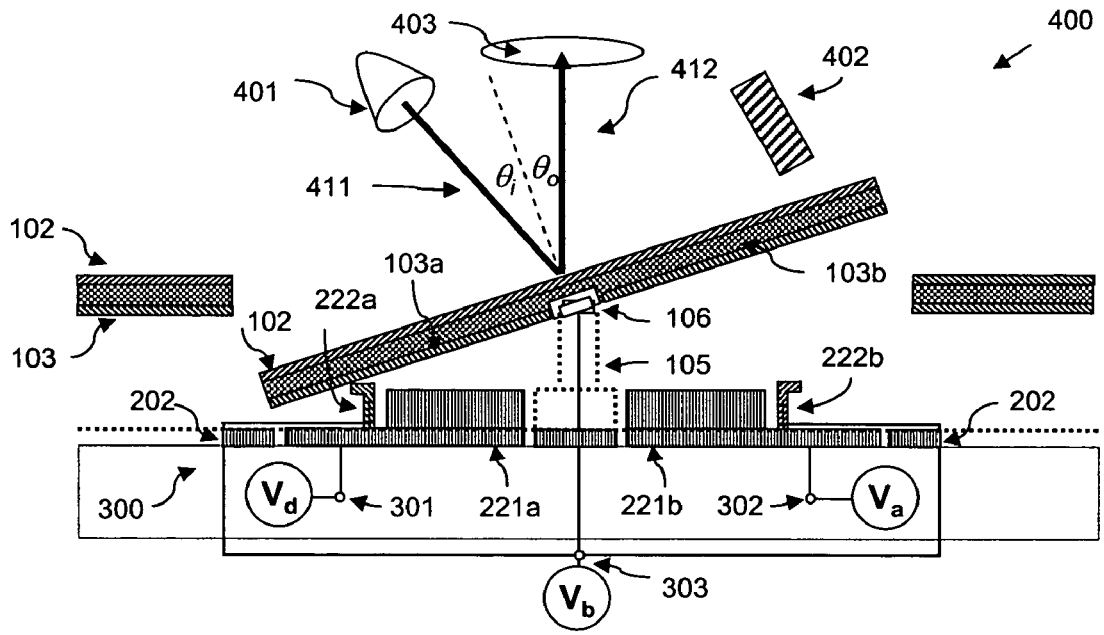
Fig. 1a: cross section view of a part of the spatial light modulator according to one embodiment of the present invention deflecting illumination to an "on" state.
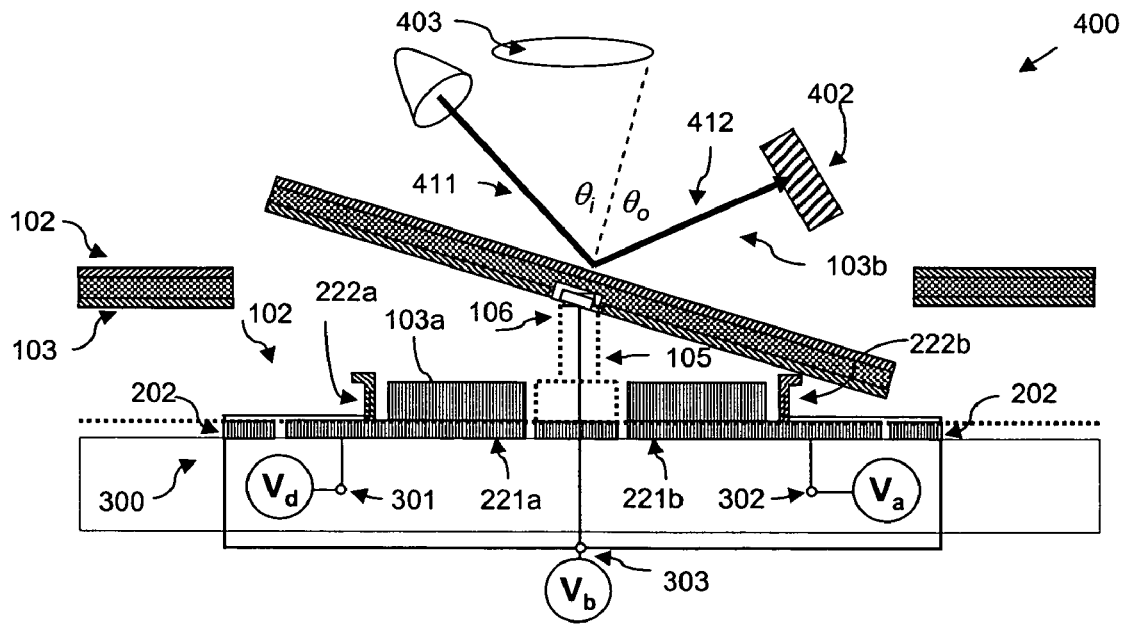
Fig. 1b: cross section view of a part of the spatial light modulator according to one embodiment of the present invention deflecting illumination to an "off" state.

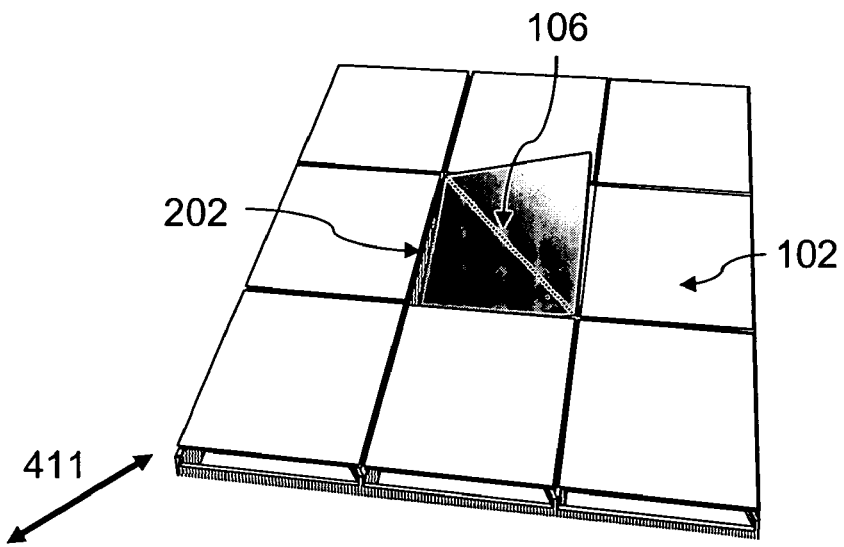
Fig. 2: A perspective view showing the top of a part of the arrays of rectangular shape mirrors for a projection system with diagonal illumination configuration.
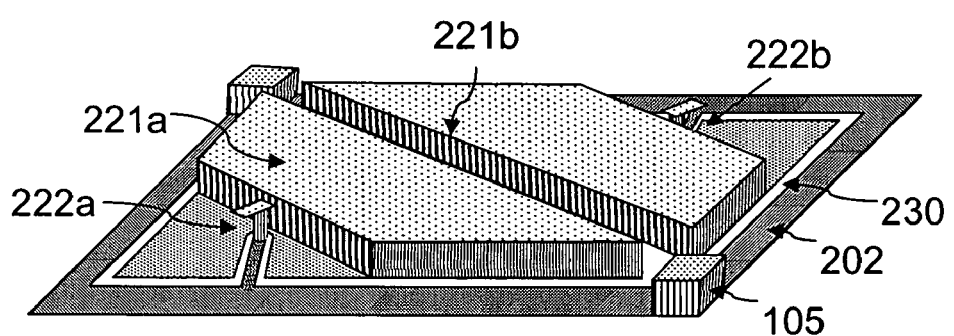
Fig. 3: A perspective view showing the top of a part of the control circuitry substrate for a projection system with diagonal illumination configuration.

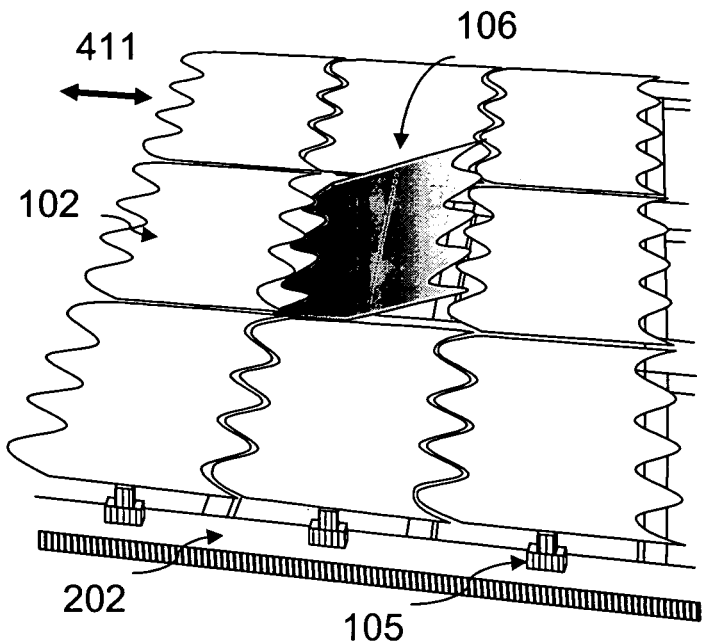

Fig. 4: A perspective view showing the top of a part of the mirror array with each mirror having a series of curvature shapes leading and trailing edges for a projection system with orthogonal illumination configuration.

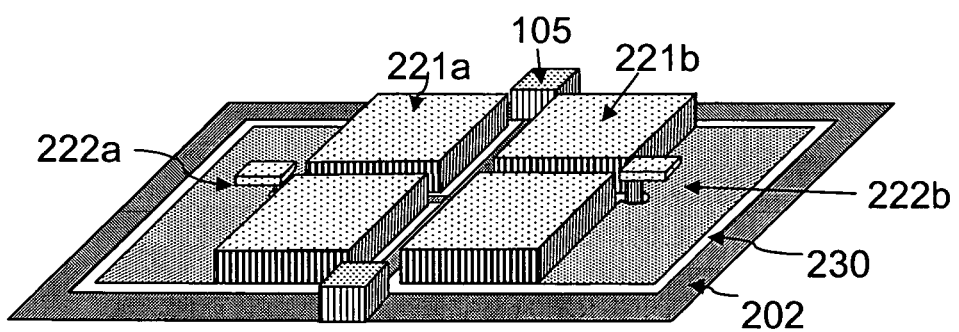

Fig. 5: A perspective view showing the top of a part of the control circuitry substrate for a projection system with orthogonal illumination configuration.

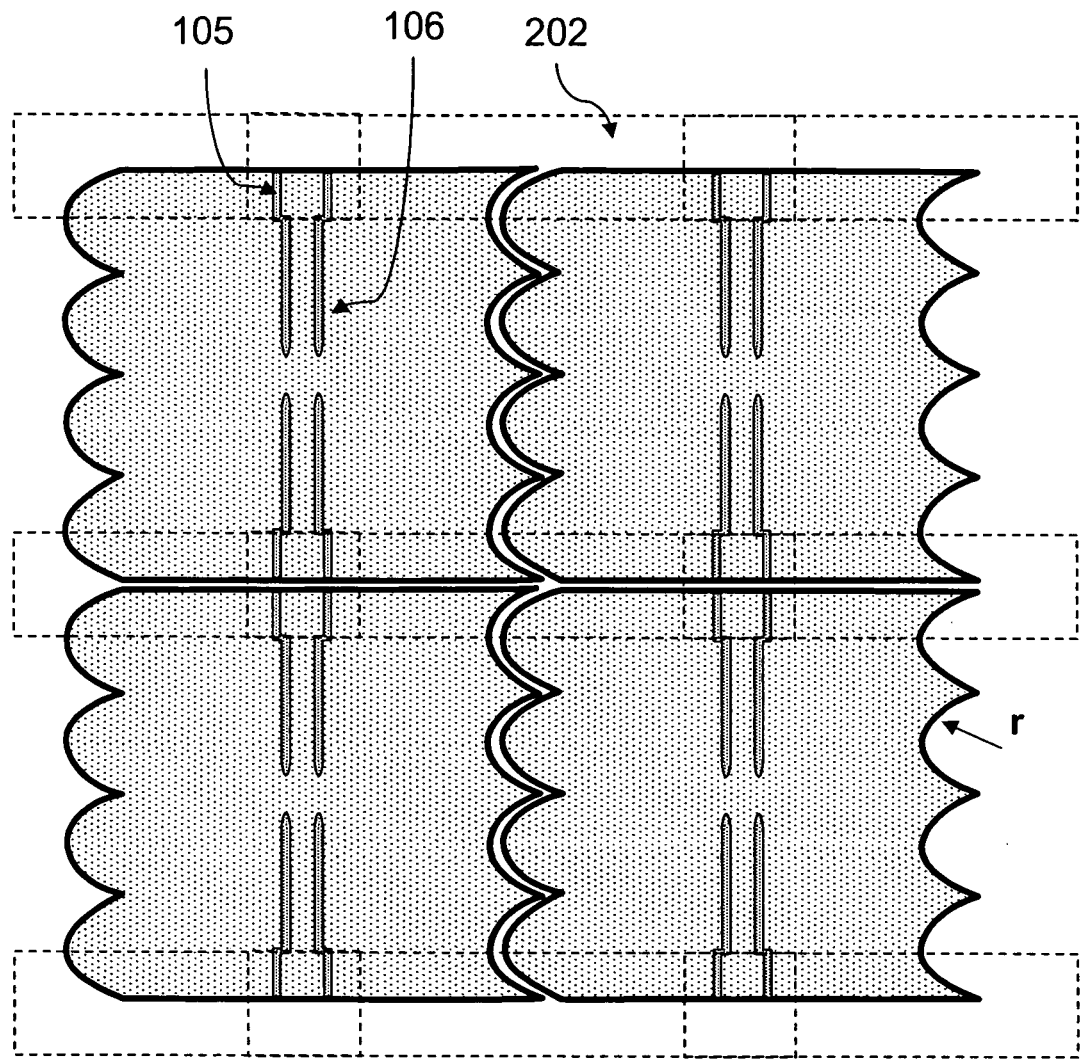
Fig. 6: An enlarged backside view of a part of the mirror array with each mirror having a series of curvature shapes leading and trailing edges for a projection system with orthogonal illumination configuration.

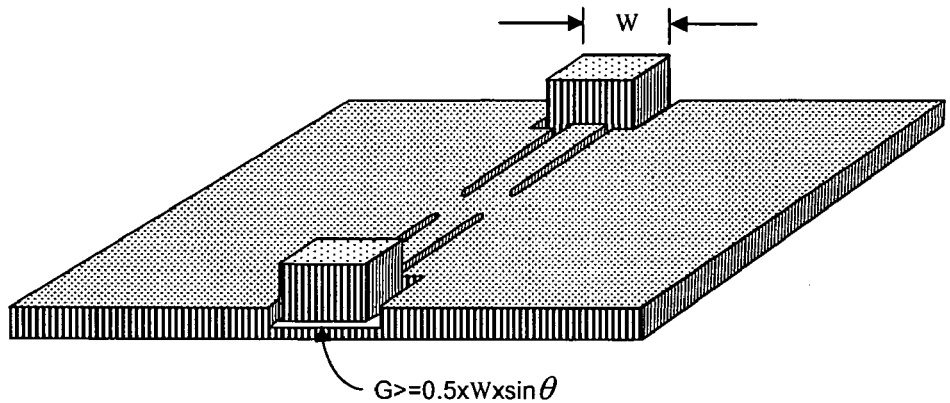
Fig. 7: A perspective view showing the embedded torsion hinges and their support posts under the cavities in the lower portion of a mirror plate.
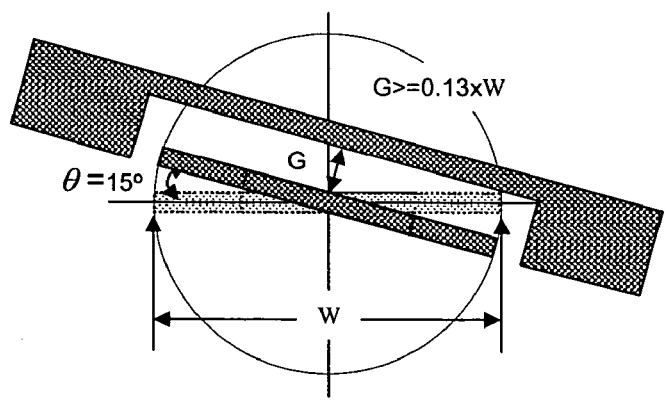
Fig. 8: A diagram illustrates a minimum air gap spacing around the embedded torsion hinge of a mirror plate when rotated 15° in one direction.

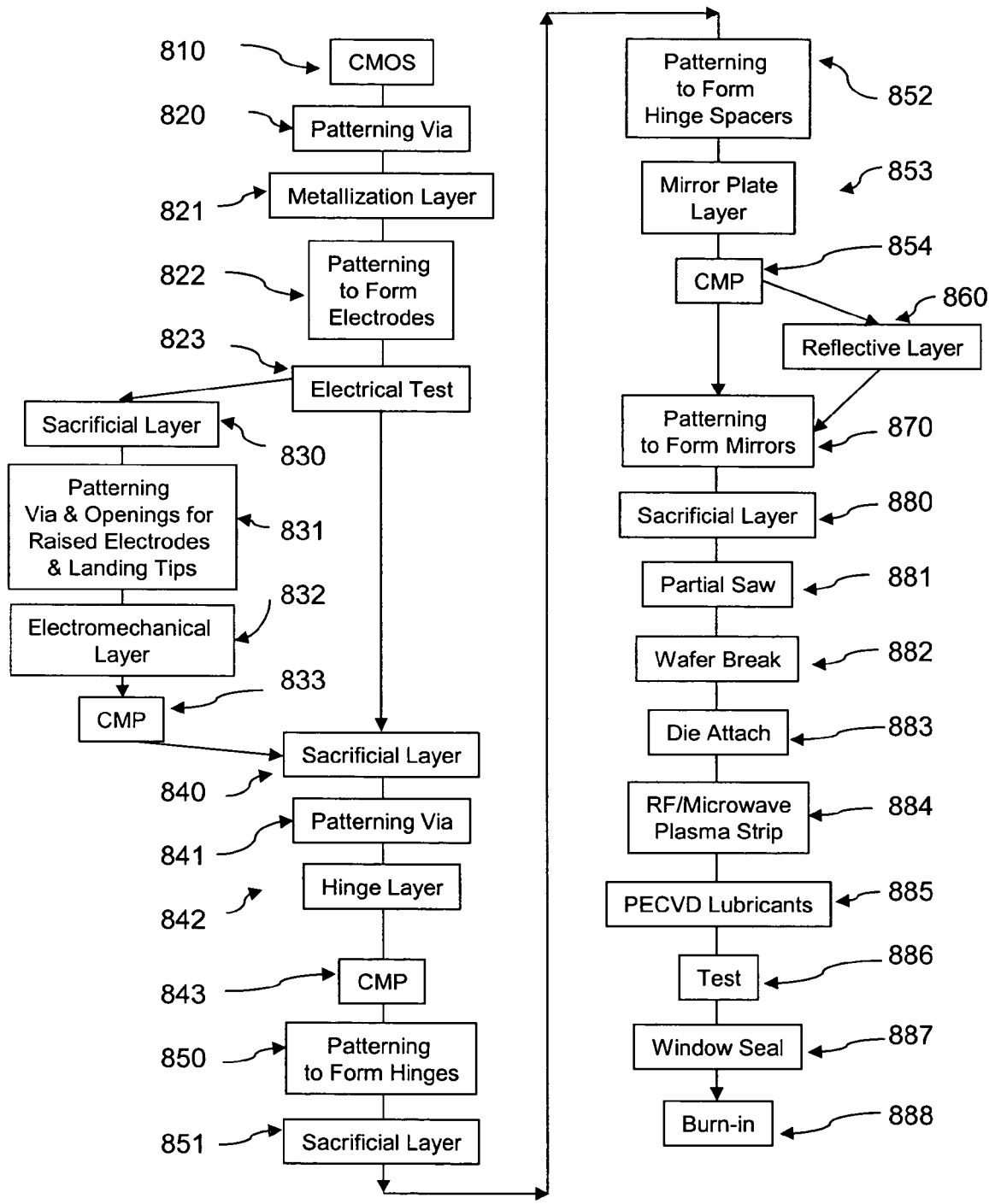
Fig. 9: A manufacturing process flow diagram for a high contrast SLM.

Fig. 10-13: Cross section side views of a part of a spatial light modulator illustrating one method for fabricating a plurality of support frames and the first level electrodes connected to the memory cells in the addressing circuitry.

Fig. 14-16: Cross section side views of a part of a spatial light modulator illustrating one method for fabricating a plurality of support posts, second level electrodes, and landing tips on the surface of control substrate.

Fig. 17A-17B: Cross section side views of a part of a spatial light modulator illustrating one method for fabricating a plurality of support posts, second level electrodes, and landing tips on the surface of control substrate.

Fig. 18A-20: Cross section side views of a part of a spatial light modulator illustrating one method for fabricating a plurality of torsion hinges and its supports on the support frame.

Fig. 18A-20: Cross section side views of a part of a spatial light modulator illustrating one method for fabricating a plurality of torsion hinges and its supports on the support frame.

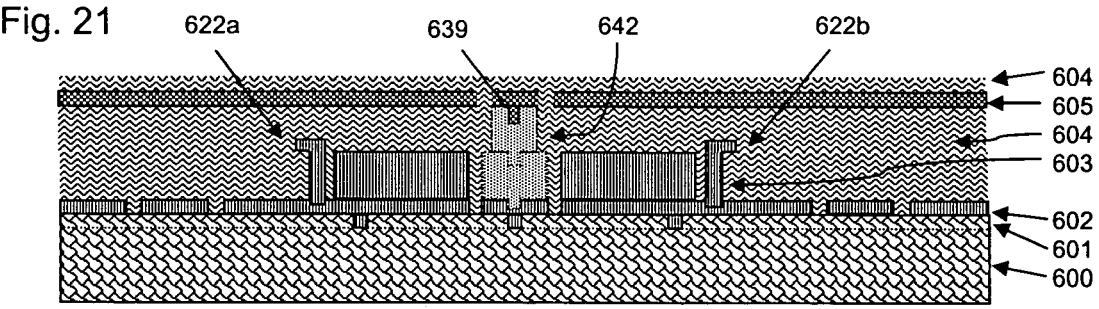
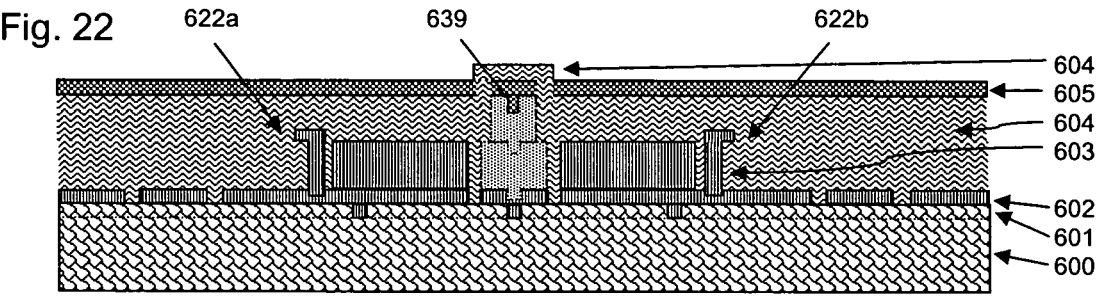
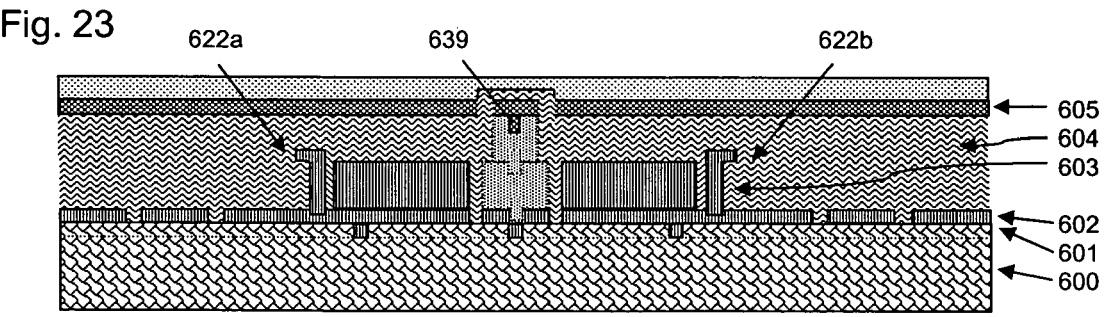
Fig. 21-23: Cross section side views of a part of a spatial light modulator illustrating one method for fabricating a mirror plate with a plurality of embedded hidden hinges.

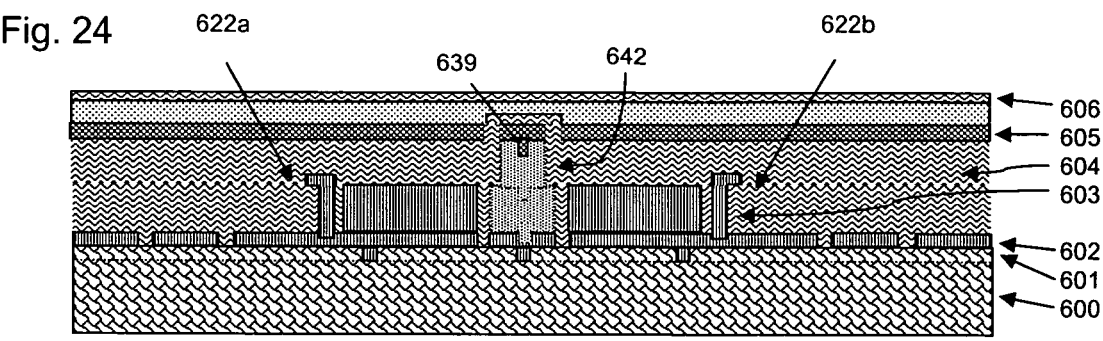
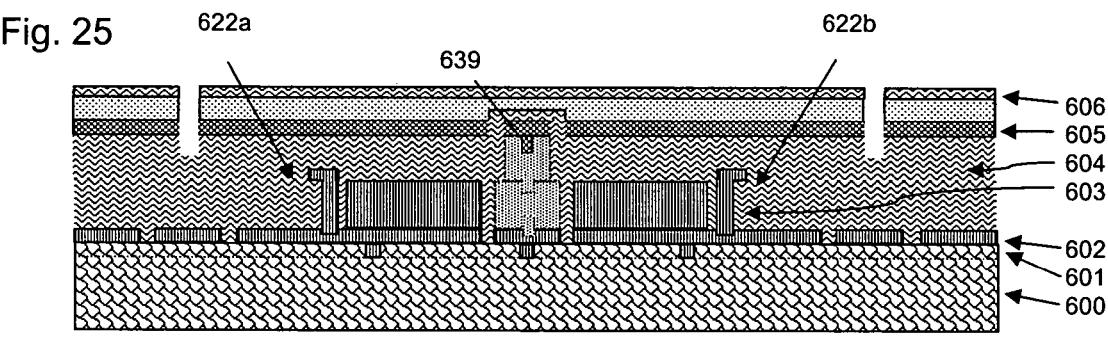
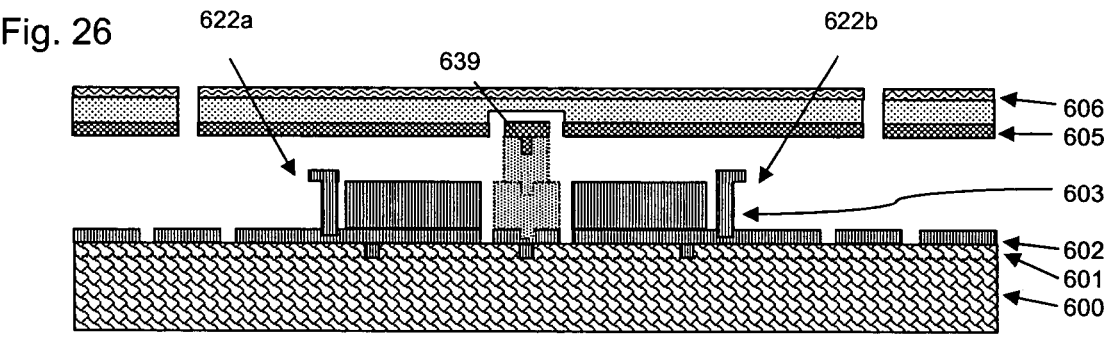
Fig. 24-26: Cross section side views of a part of a spatial light modulator illustrating one method for forming the reflective mirrors and releasing individual mirrors of a micro mirror array.

US 7,443,572 B2

FAST-RESPONSE SPATIAL LIGHT MODULATOR

BACKGROUND

The present disclosure relates spatial light modulators.

In general, a micro-mirror array (MMA) is a type of spatial light modulator (SLM) includes an array of cells, each of which includes a micro mirror that can be tilted about an axis and, furthermore, circuitry for generating electrostatic forces that tilt the micro mirror plate. In one implementation, for example, a digital mode of operation for displaying images, there are two positions at which the micro mirror plate can be tilted. The "on" position and "off" position are states of the micro-mirror in which it is stopped, and are referred to in the present specification as stopped states. In an "on" position, the micro mirror plate directs incident light to an assigned pixel of a display device. In an "off" position, the micro mirror plate direct incident light away from the display device.

A cell typically includes a first structure and a second structure configured to mechanically stop the cell's micro mirror at the "on" position and the "off" position, respectively. These structures are referred to as mechanical stops. The SLM generally operates by tilting a selected combination of micro mirrors to selectively project light to display image pixels in a display image. A display device implementing SLM-based technology is typically required to refresh images at frequencies typical of video applications. Each instance of refreshing can include the tilting of all or some of the micro mirrors to new positions. Providing fast response tilt movement by the mirrors is therefore crucial to any functional SLM-based display device. One issue with the mirror response rate is related to the stiction, i.e., contact surface adhesion, between the lower surface of the mirror and the mechanical stops, which can cause a delay in the mirror tilt response or prevent a mirror from tilting to a new orientation.

SUMMARY

In one general aspect, the present invention relates to a spatial light modulator, including: a mirror plate comprising a reflective upper surface, a lower surface, and a cavity having an opening on the lower surface; a substrate comprising an upper surface, a hinge support post in connection with the upper surface, and a hinge component supported by the hinge support post and in connection with the mirror plate, wherein the hinge component extends into the cavity and is configured to facilitate a rotation of the mirror plate; and a landing tip having a laterally extended upper portion and a vertically extended lower portion in connection with the substrate and the vertically extended lower portion, wherein the laterally extended upper portion is configured to contact the lower surface of the mirror plate to limit the rotation of the mirror plate.

In another aspect, the present invention relates to a spatial light modulator that includes a mirror plate comprising a reflective upper surface, a lower surface, and a cavity having openings on the lower surface; a substrate comprising an upper surface, a hinge support post in connection with the upper surface, and a hinge component supported by the hinge support post and in connection with the mirror plate, wherein the hinge component extends into the cavity and is configured to facilitate a rotation of the mirror plate; and a landing tip having a laterally extended upper portion and a vertically extended lower portion in connection with the substrate and the vertically extended lower portion, wherein the laterally extended upper portion extends in at least one direction outside the upper end of the vertically extended lower portion, and wherein the laterally extended upper portion is configured to contact the lower surface of the mirror plate to limit the rotation of the mirror plate.

In another general aspect, the present invention relates to a method for fabricating a landing tip, the method including: depositing a first layer of a sacrificial material over the substrate; forming a hole in the first layer of sacrificial material; depositing a first material in the hole in the first layer of sacrificial material to form a vertically extended lower portion; depositing a layer of a second material over the first layer of sacrificial material and the vertically extended lower portion of the landing tip; selectively removing the layer of the second material to form a laterally extended upper portion in connection with the vertically extended lower portion; and removing the sacrificial material to form the landing tip having the vertically extended lower portion and the laterally extended upper portion.

Implementations of the system may include one or more of the following. The vertically extended lower portion and the laterally extended upper portion can comprise a unitary body. The laterally extended upper portion can be joined with the upper surface of the vertically extended lower portion. The laterally extended upper portion can extend in one direction outside the upper end of the vertically extended lower portion to form a reverse "L" shaped landing tip. The outer end of the laterally extended upper portion can be configured to contact the lower surface of the mirror plate to limit the rotation of the mirror plate. The laterally extended upper portion can extend in two opposite directions outside the upper end of the vertically extended lower portion to form a "T" shaped landing tip. At least one outer end of the laterally extended upper portion can be configured to contact the lower surface of the mirror plate to limit the rotation of the mirror plate. The spatial light modulator can further include a step electrode over the substrate under the mirror plate, wherein the step electrode is configured to be applied with a different electric potential from the electric potential of the lower surface of the mirror plate. The lower surface of the laterally extended upper portion can be at the same height as the upper surface of the step electrode. The lower surface of the laterally extended upper portion can be at a different height from the upper surface of the step electrode. The hinge component can be configured to facilitate the rotation of the mirror plate when an electric voltage is applied across the step electrode and the conductive portion of the lower surface of the mirror plate. The vertically extended lower portion can be anchored in a hole in the substrate. The vertically extended lower portion of the landing tip can be substantially upright when the landing tip is not in contact with the lower surface of the mirror plate. The laterally extended upper portion can include a protrusion that is anchored in a hole in a top surface of the vertically extended lower portion of the landing tip. The vertically extended lower portion can include substantially the same material composition as the laterally extended upper portion. The vertically extended lower portion can include a different material than the laterally extended upper portion. The landing tip can include at least one material selected from the group consisting of silicon, polysilicon, amorphous silicon, aluminum, aluminum-silicon alloys, titanium, tantalum, tungsten, and molybdenum. The spatial light modulator can further include a plurality of landing tips each having a laterally extended upper portion and a vertically extended lower portion in connection with the substrate and the vertically extended lower portion, wherein the laterally extended upper portion is configured to contact the lower surface of the mirror plate to limit the rotation of the mirror plate at a predetermined mirror-plate orientation.

Particular embodiments of the invention can be implemented to realize one or more of the following advantages. The disclosed systems and methods provide a robust SLM hinge support posts and the spring landing tips can be anchored in the substrate to enhance their mechanical strength and connection to the substrate. The torsional hinge can also be anchored into the top surface of the hinge support post by a protrusion on the lower surface of the torsion hinge. These features strengthen the mechanical stress points in the micro mirrors, which significantly increase the durability and reliability of the SLM. The springy landing tip includes a vertically extended lower portion that is connected with the substrate, and a laterally extended upper portion in connection with the vertically extended lower portion. The springy landing tips can act as stops for the tilt movement of he micro mirrors. When pressed by the mirror plate at the stop state, both the laterally extended upper portion and the vertically extended lower portion can be elastically distorted storing elastic energies in the springy landing tips. The springy landing tip can spring back to push away the mirror plate to help the separation of the landing tips from the mirror plate when the mirror plate is tilted away from the landing tip by electrostatic forces.

The disclosed systems and methods provide a spatial light modulator (SLM) having a high active reflection area fill-ratio. A high active reflection area fill-ratio in a SLM device direct a higher percentage of incident light to be used for image display and loses a lower percentage of incident light in absorption and scattering between micro mirrors. A pair of torsion hinges extend into the cavities to be part of the lower portion of a mirror plate under the reflective surface to allow only a minute gap for a predetermined angular rotation. The mirror plate in the array is suspended by a pair of torsion hinges supported by two posts to allow the mirror plate rotate along an axis essentially in the mirror plane. By eliminating the horizontal displacement of individual mirror during the cross over transition, the gaps between adjacent mirrors in the array are significantly reduced. As a result, the active reflection area fill-ratio is increased and the brightness and the contrast of the displayed image are improved.

The disclosed system and methods are compatible with a wide range of applications, such as video displays and printings, display, printing, photo patterning in maskless photolithography, and photonic switches for directing optical signals among different optical fiber channels.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 1a illustrates a cross section view of a part of the spatial light modulator according to one embodiment of the present invention deflecting illumination to an "on" state.

FIG. 1b illustrates a cross section view of a part of the spatial light modulator according to one embodiment of the present invention deflecting illumination to an "off" state.

FIG. 2 is a perspective view showing the top of a part of the arrays of rectangular shape mirrors for a projection system with diagonal illumination configuration.

FIG. 3 is a perspective view showing the top of a part of the control circuitry substrate for a projection system with diagonal illumination configuration.

FIG. 4 is a perspective view showing the top of a part of the mirror array with each mirror having a series of curvature shapes leading and trailing edges for a projection system with orthogonal illumination configuration.

FIG. 5 is a perspective view showing the top of a part of the control circuitry substrate for a projection system with orthogonal illumination configuration.

FIG. 6 is an enlarged backside view of a part of the mirror array with each mirror having a series of curvature shapes leading and trailing edges for a projection system with orthogonal illumination configuration.

FIG. 7 is a perspective view showing the torsion hinges and their support posts under the cavities in the lower portion of a mirror plate.

FIG. 8 is a diagram illustrates a minimum air gap spacing around the torsion hinge of a mirror plate when rotated 15° in one direction.

FIG. 9 is a manufacturing process flow diagram for a high contrast spatial light modulator.

FIGS. 21-23 are cross section side views of a part of a spatial light modulator illustrating one method for fabricating a mirror plate with a plurality of hidden hinges.

FIGS. 24-26 are cross section side views of a part of a spatial light modulator illustrating one method for forming the reflective mirrors and releasing individual mirrors of a micro mirror array.

Like reference numbers and designations in the various drawings indicate like elements.

DETAILED DESCRIPTION

Figure 1C:
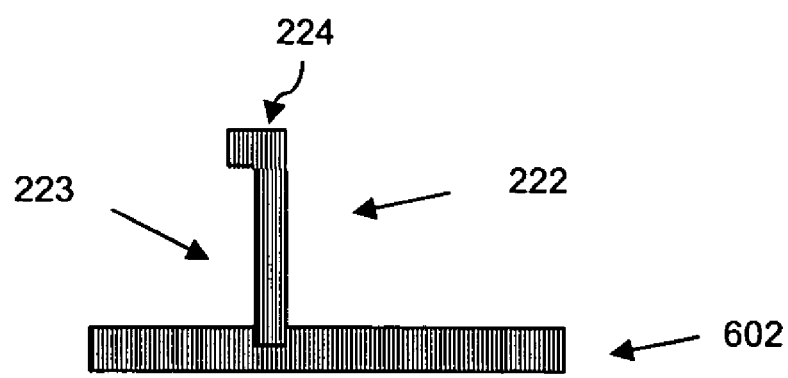
FIG. 1c shows a reverse "L" shaped landing tip in connection with a substrate.

A high contrast spatial light modulator (SLM) 400 is fabricated by coupling a high active reflection area fill-ratio and non-diffractive micro mirror array with a high electrostatic efficiency and low surface adhesion control substrate. FIG. 1a shows a cross section view of a part of the spatial light modulator 400 according to one embodiment of the present invention. Incident light 411 from a source of illumination 401 is directed at an angle of incidence θi and is reflected at an angle of θo as reflected light 412 toward a display surface through a projection pupil 403. In a digital operation mode, this configuration is commonly called the "on" position. FIG. 1b shows a cross section view of the same part of the spatial light modulator while the mirror plate is rotated toward another electrode under the other side of the hinge 106. The same directional light 411 is deflected to 412 a much larger angles θi and θo predetermined by the dimensions of mirror plate 102 and the air gap spacing between its lower surfaces of mirror 103 to the springy landing tips 222a and 222b, and exits toward a light absorber 402.

With the embodiment depicted in FIGS. 1a and 1b, the high contrast SLM 400 includes three major portions: the bottom portion of control circuitry, the middle portion that includes a plurality of step electrodes, micro landing tips, hinge support posts, and the upper portion that includes a plurality of mirrors with hidden torsion hinges and cavities.

The bottom portion is a wafer substrate 300 with addressing circuitries to selectively control the operation of each mirror in the micro mirror array of SLM. The addressing circuitries include an array of memory cells and word-line/bit-line interconnect for communication signals. The electrical addressing circuitry on a silicon wafer substrate may be fabricated using standard CMOS technology, and resembles a low-density memory array.

The middle portion of the high contrast SLM 400 is formed by arrays of step electrodes 221, springy landing tips 222a and 222b, hinge support posts 105, and a support frame 202. The multi-level step electrodes 221 are designed to improve the capacitive coupling efficiency of electrostatic torques during the angular cross over transition. By raising the electrode 221 surfaces near the hinge 106 area, the air gap spacing between the mirror plate 103 and the electrodes 221 is effectively narrowed. Since the electrostatic attractive force is inversely proportional to the square of the distance between the mirrors and electrodes, this effect becomes apparent when mirror is tilted at its landing positions. When operating in analog mode, high efficient electrostatic coupling allows a more precise and stable control of the tilting angles of the individual micro mirror in the spatial light modulator. In a digital mode, it requires much lower driving voltage potential in addressing circuitry to operate. The height differences between the first level electrodes 221 to the second may vary from 0.2 microns to 3 microns depends on the relative height of air gap between the first level electrodes to the mirror plate.

On the surfaces of control substrate are situated a pair of springy landing tips 222a and 222b, which optionally can have a same height as that of second level electrodes 221 for ease of manufacturing. The springy landing tips 222a and 222b provide a gentle mechanical touch-down for the mirror to land on each angular cross over transition at a pre-determined angle precisely. The springy landing tips 222a and 222b (which are not in electrical contact with the electrodes 221) are kept at the same electric potential as the lower conductive surface of the mirror plate as shown in FIGS. 1a and 1b. This ensures proper voltage bias between the mirror plate and the step electrodes and no current transfer between the mirror plate and the landing tips. The springy landing tips 222a and 222b on the surface of control substrate improve the response rate and the reliability of the mirror tilt movement, which enhances the robustness of operation of the SLM devices.

Figure 1D:
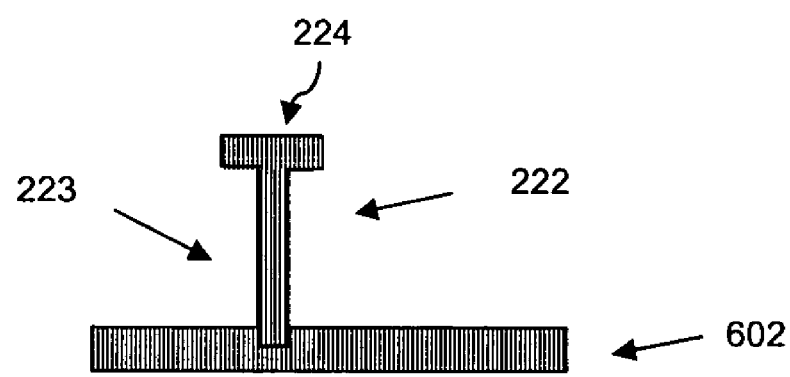
FIG. 1d shows an "T" shaped landing tip in connection with a substrate.

As shown in FIG. 1c, the landing tip 222 includes a laterally extended top portion 224 and a vertically extended lower portion 223 in connection with the surface layer 602 (i.e., electromechanical layer) of the substrate. The vertically extended lower portion 223 can be anchored in a hole in the surface layer 602 to enhance the mechanical strength of the landing tip 222. The vertically extended lower portion 223 and the laterally extended top portion 224 can be joined as a unitary body by a sequence of processing steps, as described below. The laterally extended top portion 224 can extend beyond the top end of the vertically extended lower portion 223 in one direction to form a reverse "L" shaped landing tip 222 as shown in FIG. 1c, or in two opposite directions to form a "T" shape landing tip 222 as shown in FIG. 1d.

As shown in FIGS. 1a and 1b, the cantilever end of the laterally extended upper portion 224 in the reverse "L" shaped landing tip 222 extends toward the edge of the mirror plate and can come in contact with the lower surface of the mirror plate to stop its tilt movement. This arrangement of the reverse "L" shaped landing tip 222 helps to maximize the bending of the springy landing tip 222, which provides an effective separation force for separating the springy landing tip 222 and the mirror plate. In the case of the "T" shape landing tip 222, one cantilever end of the laterally extended upper portions 224 can come to contact with the lower surface of the mirror plate to stop the tilt movement of the mirror plate.

The landing tip 222 can be made from one or more of silicon, poly-silicon, amorphous silicon, aluminum, aluminum alloys, titanium, tantalum, tungsten, and molybdenum. The vertical lower portion 223 and the lateral top portion 224 can be made from the same or from different materials. The typical widths of the vertically extended lower portion 223 and the thickness of the laterally extended upper portion 224 are in the range of 0.2-0.8 microns. The laterally extended upper portion 224 can extend beyond the vertically extended lower portion 223 by approximately 0.5-1.0 microns.

Figure 1E:
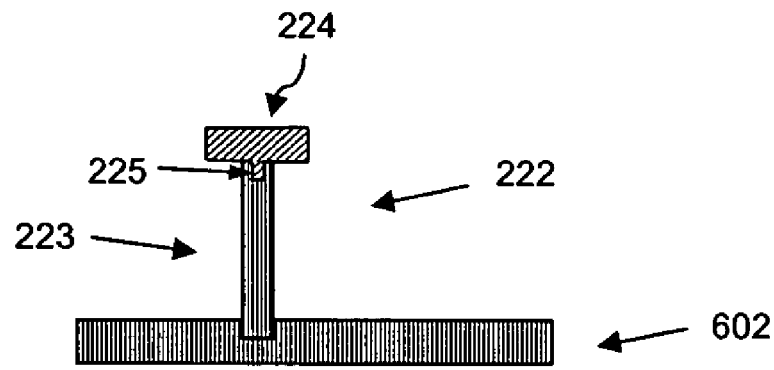
FIG. 1e shows a landing tip comprising a laterally extended upper portion anchored a hole in the top surface of a vertically extended lower portion.

The laterally extended upper portion 224 can include a protrusion 225 that is anchored in a hole in the top surface of a vertically extended lower portion 223, as shown in FIG. 1e. The anchoring of the laterally extended upper portion 224 into the vertically extended lower portion 223 can enhance the mechanical strength of the connection between the two portions, which is particularly appropriate when the two portions comprise different material compositions.

The relatively small contact area between springy landing tips 222a and 222b and the mirror 103 facilitate their separation by reducing or effectively eliminating stiction. The springy landing tips 222a and 222b are slightly bent when pressed down by the lower surface of the mirror plate. Both the laterally extended portions and the vertically extended portions in the reverse "L" shape or the "T" shaped landing tips can be bent by the lower surface of the mirror plate. Thus these springy landing tips can store more elastic energy than can a simple upright vertical landing tips. The elastic energies stored by the bending distortions of the landing tips 222a and 222b can be more effective to assist the separation between the landing tips and the lower surface of the mirror plate once the attractive electrostatic force is removed or replaced by a repulsive force.

For example, to initiate an angular cross over transition, a sharp bipolar pulse voltage Vb is applied on the bias electrode 303, typically connected to each mirror plate 103 through its torsion hinges 106 and support posts 105. The voltage potential established by the bipolar bias Vb enhances the electrostatic forces on both side of the hinge 106. This strengthening is unequal on two sides at the landing position, due to the large difference in air gap spacing. Though the increases of bias voltages Vb on the lower surface of mirror plate 103a and 103b has less impact on which direction the mirror 102 will rotate toward, a sharp increase of electrostatic forces F on the whole mirror plate 102 provides a dynamic excitation by converting the electromechanical kinetic energy into an elastic strain energy stored in the deformed mirror hinges 106 and deformed the springy landing tips 222a or 222b. After a bipolar pulse is released on the common bias Vb, the elastic strain energy of deformed springy landing tip 222a or 222b and deformed mirror hinges 106 is converted back to the kinetic energy of mirror plate as it springs and bounces away from the springy landing tips 222a or 222b. This perturbation of mirror plate toward the quiescent state enables a much smaller address voltage potential Va for angular cross over transition of mirror plate 103 from one state to the other.

Hinge support frame 202 on the surface of control substrate 300 is designed to strengthen the mechanical stability of the pairs of mirror support posts 105, and retained the electrostatic potentials locally. For ease of manufacturing, the height of support frames 202 is designed to be the same as the height of the first level electrodes 221. With a fixed size of mirror plate 103, the height of a pair of hinge support posts 105 will determine the maximum deflection angles θ of a micro mirror array.

The upper portion of the high contrast SLM is fully covered by arrays of micro mirrors with a flat optically reflective layer 102 on the upper surfaces and a pair of torsion hinges 106 under the cavities in the lower portion of mirror plate 103. A pair of torsion hinges 106 in the mirror plate 103 is fabricated to be part of the mirror plate 103 and are kept in a minimum distance under the reflective surface to allow only a gap for a pre-determined angular rotation. By minimizing the distances between a hinge rotating axes 106 to the upper reflective surfaces 102, the spatial light modulator effectively eliminates the horizontal displacement of each mirror during an angular transition. According to the present invention, the gaps between adjacent mirrors in the array of SLM can be reduced to less than 0.2 microns to achieve the highest active reflection area fill-ratio of a micro mirror array at the present time.

The materials used for micro deflection devices are preferably conductive, stable, with suitable hardness, elasticity, and stress. Ideally a single material, such as electromechanical materials, will cover both the stiffness of mirror plate 103 and plasticity of torsion hinges 106 having sufficient strength to deflect without fracturing. Furthermore, all the materials used in constructing the micro mirror array have to be processed under 400° C., a typical manufacturing process temperature without damaging the pre-fabricated circuitries in the control substrate.

In the implementation shown in FIGS. 1a and 1b, the mirror plate 102 includes three layers. A reflective top layer 103a is made of aluminum and is typically 600 angstrom thick. A middle layer 103b can be made of a silicon based material, for example, amorphous silicon, typically 2000 to 5000 angstrom in thickness. A bottom layer 103c is made of titanium and is typically 600 angstrom thick: As can be seen from FIGS. 1a and 1b, the hinge 106 can be implemented as part of the bottom layer 103c. The mirror plate 102 can be fabricated as described below.

According to an alternative embodiment, the materials of mirror plates 103, torsion hinges 106, and support posts 105 are made of aluminum-silicon based electromechanical materials, such as aluminum, silicon (including single crystal silicon, polysilicon and amorphous silicon), aluminum-silicon, and their alloys. The deposition is accomplished by PVD magnetron sputtering a single target containing either or both aluminum and silicon in a controlled chamber with temperature bellow 500° C. Same structure layers may also be formed by PECVD.

According to an alternative embodiment, the materials of mirror plates 103, torsion hinges 106, and support posts 105 are made of refractory-metals based electromechanical materials, such as titanium, tantalum, tungsten, molybdenum, their suicides, and their alloys. Refractory metal and their silicides are compatible with CMOS semiconductor processing and have relatively good mechanical properties. These materials can be deposited by PVD, by CVD, and by PECVD. The optical reflectivity may be enhanced by further PVD depositing a layer of metallic thin-films 102, such as aluminum, gold, or their alloys depending on the applications on the surfaces of mirror plate 103.

To achieve high contrast ratio of the deflected video images, any scattered light from a micro mirror array should be reduced or eliminated. Most common interferences come from the diffraction patterns generated by the scattering of illumination from the leading and trailing edges of individual mirrors. The solution to the diffraction problem is to weaken the intensity of diffraction pattern and to direct the scattered light from the inactive area of each pixel to different directions away from the projection pupil. One method is directing the incident light 411 45° to the edges of the square shape mirror 102 pixels, which sometimes called diagonal hinge or diagonal illumination configuration. FIG. 2 shows a perspective view showing the top of a part of the mirror array with each mirror 102 having a square shape using a diagonal illumination system. The hinges 106 of mirror in the array are fabricated in diagonal direction along two opposite corners of the mirror and in perpendicular to the light of illumination 411. The advantage of a square shape mirror with a diagonal hinge axis is its ability to deflect the scattered light from the leading and trailing edges 45° away from the projection pupil 403. The disadvantage is that it requires the projection prism assembly system to be tilted to the edge of the SLM. The diagonal illumination has a low optical coupling efficiency when a conventional rectangular TIR prism system is used to separate the "on" and "off" light selected by each mirror 102. The twisted focusing spot requires an illumination larger than the size of rectangular micro mirror array surfaces in order to cover all active pixel arrays. A larger rectangular TIR prism increases the cost, size, and the weight of the projection display.

FIG. 3 shows a perspective view of the top of a part of the control circuitry substrate for the projection system with diagonal illumination configuration. The pair of step electrodes 221 is arranged diagonal accordingly to improve the electrostatic efficiency of the capacitive coupling to the mirror plate 103. The two springy landing tips 222a or 222b includes a vertically extended portion that is connected to the surface layer 202 of the substrate, and a laterally extended portion in connection with the top end of the vertically extended portion. The two springy landing tips 222a and 222b can act as the landing stops for a mechanical landing of mirrors 103 to ensure the precision of tilted angle θ and to overcome the contact stictions. Made of high spring constant materials, these springy landing tips 222a and 222b act as landing springs to reduce the contact area when mirrors are snap down. Second function of these springy landing tips 222a and 222b at the edge of two-level step electrodes 221 is their spring effect to separate itself from the mirror plates 103. When a sharp bipolar pulse voltage potential Vb is applied on the mirror103 through a common bias 303 of mirror array, a sharp increase of electrostatic forces F on the whole mirror plate 103 provides a dynamic excitation by converting the electromechanical kinetic energy into an elastic strain energy stored in the deformed mirror hinges 106. The elastic strain energy is converted back to the kinetic energy of mirror plate 103 as it springs and bounces away from the springy landing tips 222a and 222b.

The periodic array of the straight or corner shape edges of mirror in a SLM creates a diffraction patterns tended to reduce the contrast of projected images by scattering the illumination 411 at a fixed angle. A curvature shape leading and trailing edges of mirror in the array generates much weaker diffraction patterns due to the variation of scattering angles of the illumination 411 on the edges of mirror. According to another embodiment of the present invention, the reduction of the diffraction intensity into the projection pupil 403 while still maintaining an orthogonal illumination optics system is achieved by replacing the straight or fixed angular comer shape edges of a rectangular shape mirror with at least one or a series curvature shape leading and trailing edges with opposite recesses and extensions. Forming a curvature in the leading and trailing edges that is in perpendicular to the incident illumination 411 weakens the diffraction intensity and reduces a large portion of scattering light diffracted directly into the projection system.

Orthogonal illumination has a higher optical system coupling efficiency, and requires a less expensive, smaller size, and lighter TIR prism. However, since the scattered light from both leading and trailing edges of mirror is scattered straightly into the projection pupil 403, it creates a diffraction patterns reducing the contrast ratio of a SLM. FIG. 4 shows a perspective view of the top of a part of mirror array with rectangular shape mirrors for the projection system with orthogonal illumination configuration. The torsion hinges 106 are in parallel to the leading and trailing edges of mirror and in perpendicular to the light of illumination 411. So the mirror pixels in the SLM are illuminated orthogonally. In FIG. 4, each mirror in the array has a series of curvatures in the leading edge extension and trailing edge recession. The principle is that a curvature edge weakens the diffraction intensity of scattered light and it further diffracts a large portion of scattered light at a variation of angles away from the optical projection pupil 403. The radius curvature of leading and trailing edges of each mirror r may vary depending on the numbers of curvatures selected. As the radius of curvature r becomes smaller, the diffraction reduction effect becomes more prominent. To maximize the diffraction reduction effects, according to another embodiment of the present invention, a series of small radius curvatures r are designed to form the leading and trailing edges of each mirror in the array. The number of curvatures may vary depending on the size of mirror pixels, with a 10 microns size square mirror pixel, two to four curvatures on each leading and trailing edges provides an optimum results an low diffraction and within current manufacturing capability.

FIG. 5 shows a perspective view showing the top of a part of the control circuitry substrate 300 for a projection system with orthogonal illumination 411 configurations. Unlike conventional flat electrodes, the two-level step electrodes 221 raised above the surface of control substrate 300 near the hinge axis narrows the effective air gap spacing between the flat mirror plate 103 and the bottom electrodes 221, which significantly enhancing the electrostatic efficiency of capacitive coupling of mirror plate 103. The number of levels for the step electrodes 221 can be varying from one to ten. However, the larger the number of levels for step electrodes 221 the more complicated and costly it takes to manufacture the devices. A more practical number would be from two to three.

The springy landing tips 222a and 222b in FIG. 5 are joined with the control substrate 300 at their vertically extended lower portions. The laterally extended upper portions of the springy landing tips 222a and 222b are connected with the upper ends of the vertically extended lower portions. The laterally extended upper portions serve as mechanical landing stops for the mirror plate. These springy landing tips 222a and 222b can store elastic energies at the contact and can help overcome the contact surface adhesion when the mirror plate is flipped away from the lading tip. This low voltage driven and high efficiency micro mirror array design allows an operation of a larger total deflection angle ($|\theta|>15°$) of micro mirrors to enhance the brightness and contrast ratio of the SLM 400.

Another advantage of this reflective spatial light modulator is that it produces the highest possible active reflection area fill-ratio by positioning the torsion hinge 106 under the cavities in the lower portion of mirror plate 103, which almost completely eliminates the horizontal displacement of mirror 103 during an angular cross over transition. FIG. 6 shows an enlarged backside view of a part of the mirror array designed to reduce diffraction intensity using four-curvature leading and trailing edges for a projection system with orthogonal illumination 411 configuration. pairs of torsion hinges 106 are positioned under two cavities as part of the mirror lower portion 103 and supported by a pair of support posts 105 on top of support frames 202. A pair of hinge support post 105 has a width W in the cross section much larger than the width of torsion hinge bar 106. Since the distance between the axis of hinge 106 to the reflective surfaces of mirror is kept minimum, a high active reflection area fill-ratio is achieved by closely packed individual mirror pixels without worrying the horizontal displacement. In one of the present invention, mirror pixel size (a×b) is about 10 microns×10 microns, while the radius of curvature r is about 2.5 microns.

FIG. 7 shows an enlarged backside view of a part of the mirror plate showing the torsion hinges 106 and their support posts 105 under the cavities in the lower portion of a mirror plate 103. To achieve optimum performance, it is important to maintain a minimum air gap G in the cavity where the torsion hinges 106 are created. The dimension of hinges 106 varies depending on the size of the mirrors 102. At present invention, the dimension of each torsion hinge 106 is about 0.1×0.2×3.5 microns, while the support post 105 has a square shape cross section with each side W about 1.0 micron width. Since the top surfaces of support posts 105 are also under the cavities as lower part of the mirror plate 103, the air gap G in the cavity needs to be high enough to accommodate the angular rotation of mirror plate 103 without touching the larger hinge support posts 105 at a predetermined angle $\theta$. In order for the mirror to rotate a pre-determined angle $\theta$ without touching the hinge support post 105, the air gap of the cavities where torsion hinges 106 are positioned must be larger than $G=0.5\times W\times SIN(\theta)$, where W is the cross section width of hinge support posts 105.

Figure illustrates a minimum air gap spacing G around the torsion hinge 106 of a mirror plate 103 when rotated 15° in one direction. The calculation indicates the air gap spacing G of torsion hinge 106 in the cavity must be larger than $G=0.13 W$. If width of each side W of a square shape hinge support post 105 is 1.0 micron, the air gap spacing G in the cavity should be larger than 0.13 microns. Without horizontal displacement during the angular transition operation, the horizontal gap between the individual mirrors in the micro mirror array may be reduced to less than 0.2 microns, which led to a 96% active reflection area fill-ratio of the SLM according to the present invention.

Fabrication of a high contrast spatial light modulator can be implemented as four sequential processes using standard CMOS technology. A first process forms a control silicon wafer substrate with support frames and arrays of first level electrodes on the substrate surface. The first level electrodes are connected to memory cells in addressing circuitry in the wafer. A second process forms a plurality of second level electrodes, micro landing tips, and hinge support posts on the surfaces of control substrate. A third process forms a plurality of mirrors with hidden hinges on each pairs of support posts. lasting a fourth process, the fabricated wafer is separated into individual spatial light modulation device dies before finally removing remaining sacrificial materials.

FIG. 9 is a flow diagram illustrating a process for making a high contrast spatial light modulator. The manufacturing processes starts by fabricating a CMOS circuitry wafer having a plurality of memory cells and word-line/bit-line interconnection structures for communicating signals as the control substrate using common semiconductor technology (step 810).

A plurality of first level electrodes and support frames are formed by patterning a plurality of via through the passivation layer of circuitry opening up the addressing nodes in the control substrate (step 820). To enhance the adhesion for subsequent electromechanical layer, the via and contact openings are exposed to a 2000 watts of RF or microwave plasma with 2 torr total pressures of a mixture of O2, CF4, and H2O gases at a ratio of 40:1:5 at about 250° C. temperatures for less than five minutes.

Figure 10:
FIGS. 10-13 are cross section side views of a part of a spatial light modulator illustrating one method for fabricating a plurality of support frames and the first level electrodes connected to the memory cells in the addressing circuitry.
Figure 11:
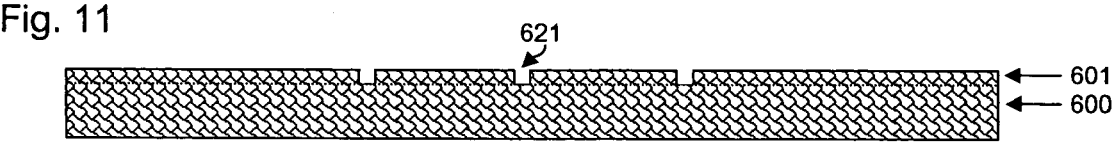

An electromechanical layer is deposited by physical vapor deposition (PVD) or plasma-enhanced chemical vapor deposition (PECVD) depending on the materials selected filling via and forming an electrode layer on the surface of control substrate (step 821). The deposition of the electromechanical layer and the subsequent formation of the vias are illustrated in FIGS. 10 and 11, and discussed below in relation to FIGS. 10 and 11.

Figure 12:
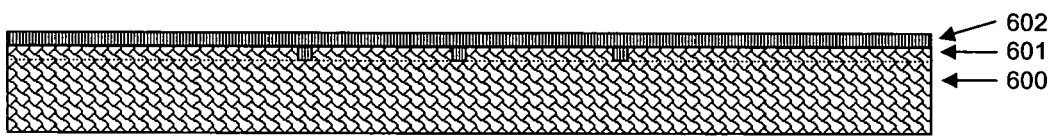
Figure 13:
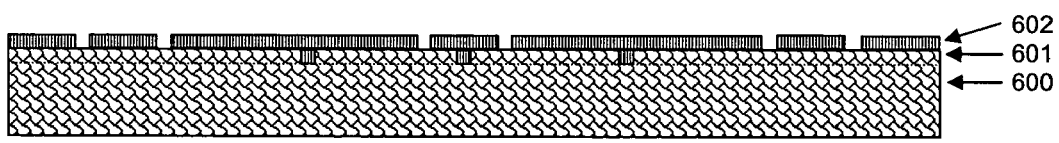

The electromechanical layer is patterned and etched anisotropically through to form a plurality of electrodes and support frames (step 822). The partially fabricated wafer is tested to ensure the electrical functionality before proceeding to further processes (step 823). The formation of electrodes and support frames are illustrated in FIGS. 12 and 13 and described in detail below in the related discussions.

According to one embodiment of the present invention, the electromechanical layer deposited and patterned in the steps 821 and 822 can include a metal including, for example, a pure Al, titanium, tantalum, tungsten, molybdenum film, an Al/poly-Si composite, an Al—Cu alloy, or an Al—Si alloy. While each of these metallization has slightly different etching characteristics, they all can be etched in similar chemistry in plasma etching of Al. In present invention, a two step processes is carried out to etch aluminum metallization layers anisotropically. First, the wafer is etched in inductive coupled plasma while flowing with BCl3, Cl2, and Ar mixtures at flow rates of 100 sccm, 20 sccm, and 20 sccm respectively. The operating pressure is in the range of 10 to 50 mTorr, the inductive coupled plasma bias power is 300 watts, and the source power is 1000 watts. During the etching process, wafer is cooled with a backside helium gas flow of 20 sccm at a pressure of 1 Torr. Since the Al pattern can not simply be removed from the etching chamber into ambient atmosphere, a second oxygen plasma treatment step must be performed to clean and passivate Al surfaces. In a passivation process, the surfaces of partially fabricated wafer is exposed to a 2000 watts of RF or microwave plasma with 2 torr pressures of a 3000 sccm of H2O vapor at about 250° C. temperatures for less than three minutes.

According to another embodiment of the present invention, the electromechanical layer deposited and patterned in the steps 821 and 822 can include silicon, which can take the form of a polysilicon, a polycides, or a silicide. While each of these electromechanical layers has slightly different etching characteristics, they all can be etched in similar chemistry in plasma etching of polysilicon. Anisotropic etching of polysilicon can be accomplished with most Cl and F based feedstock, such as Cl2, BCl3, CF4, NF3, SF6, HBr, and their mixtures with Ar, N2, O2, and H2. In present invention, the poly silicon or silicide layer (WSix, or TiSix, or TaSi) is etched anisotropically in inductive decoupled plasma while flowing with Cl2, BCl3, HBr, and HeO2 gases at flow rates of 100 sccm, 50 sccm, 20 sccm, and 10 sccm respectively. In another embodiment, the polycide layer is etched anisotropically in a reactive ion etch chamber flowing with Cl2, SF6, HBr, and HeO2 gases at a flow rate of 50 sccm, 40 sccm, 40 sccm, and 10 sccm respectively. In both cases, the operating pressure is in the range of 10 to 30 mTorr, the inductive coupled plasma bias power is 100 watts, and the source power is 1200 watts. During the etching process, wafer is cooled with a backside helium gas flow of 20 sccm at a pressure of 1 Torr. A typical etch rate can reach 9000 angstroms per minute.

In order to improve the electrostatic efficiency and reduce the stiction during the angular cross over transition of the micro mirror arrays, a plurality of second level electrodes and micro landing tips are fabricated on the surfaces of control substrate. First, a layer of sacrificial materials is deposited with a predetermined thickness on the surface of partially fabricated wafer (step 830). If the sacrificial material is photoresist, the layer is spin coated on the surface. If it is organic polymer, the layer is deposited by PECVD. To prepare for the subsequent build up, the sacrificial layer has to be hardened by exposing the layer to ultraviolet light, then exposing to a CF4 plasma for about three minutes, then baking the layer at about 150° C. for about two hours, finally exposing the layer to oxygen plasma for about one minute. Second, the sacrificial layer is patterned forming via and contact openings for a plurality of second level electrodes, landing tips, and support posts (step 831). Third, a second electromechanical layer is deposited by PVD or PECVD depending on the materials selected forming a plurality of second level electrodes, landing tips, and support posts (step 832). Finally, the second electromechanical layer is planarized to a predetermined thickness by chemical mechanical polishing (CMP) (step 833). In one implementation, the height of second level electrodes and micro landing tips are less than one micron. Step 830 through step 833 can be repeated to build a number of steps in the step electrodes 221a and 221b. The number of repeated steps 830-833 is determined by the number of steps in the step electrodes 221a and 221b. The steps 830-833 can be bypassed (i.e. from step 823 directly to step 840) when a flat electrode is fabricated on the control substrate.

Once the raised multi-level step electrodes and micro landing tips are formed on the CMOS control circuitry substrate, a plurality of mirrors with hidden hinges on each pairs of support posts are fabricated. The processes started with depositing sacrificial materials with a predetermined thickness on the surface of partially fabricated wafer (step 840). Then sacrificial layer is patterned to form via for a plurality of hinge support posts (step 841). The sacrificial layer is further hardened before a deposition of electromechanical materials by PVD or PECVD depending on materials selected to fill via and form a thin layer for torsion hinges and part of mirrors (step 842). The electromechanical layer planarized to a predetermined thickness by CMP (step 843). The electromechanical layer is patterned a plurality of openings to form a plurality of torsion hinges (step 850). To form a plurality of cavities in the lower portion of mirror plate and torsion hinges positioned under the cavity, sacrificial materials is again deposited to fill the opening gaps around the torsion hinges and to form a thin layer with a predetermined thickness on top of hinges (step 851). The thickness can be slightly larger than $G=0.5 \times W \times SIN(\theta)$, where W is the cross section width of hinge support posts 105. The sacrificial layer patterned to form a plurality of spacers on top of each torsion hinge (step 852). More electromechanical materials are deposited to cover the surface of partially fabricated wafer (step 853). The electromechanical layer is planarized to a predetermined thickness by CMP (step 854) before patterned a plurality of openings to form a plurality of air gaps between individual mirror plates (step 870). The reflectivity of mirror surface may be enhanced by a PVD deposition of 400 angstroms or less thickness reflective layer selected from the group consisting of aluminum, gold, and combinations thereof (step 860).

To separate the fabricated wafer into individual spatial light modulation device dies, a thick layer of sacrificial materials is deposited to cover the fabricated wafer surfaces for protection (step 880). Then the fabricated wafer is partially sawed (step 881) before separating into individual dies by scribing and breaking (step 882). The spatial light modulator device die is attached to the chip base with wire bonds and interconnects (step 883) before a RF or microwave plasma striping of the remaining sacrificial materials (step 884). The SLM device die is further lubricated by exposing to a PECVD coating of lubricants in the interfaces between the mirror plate and the surface of electrodes and landing tips (step 885) before electro-optical functional test 886. Finally, the SLM device is hermetically sealed with a glass window lip (step 887) and sent to burn-in process for reliability and robust quality control (step 888).

One of the major problems in the digital operation of micro mirror array is the high stiction of micro mirror at a mechanical landing position. The surface contact adhesion could increases beyond the electrostatic force of control circuitry causing the device from stiction failure in a moisture environment. To reduce the contact adhesion between the mirror plate 103 and landing tips 222a and 222b, and protect the mechanical wear degradation of interfaces during the touch and impact of angular cross over transition, a thin lubricated coating is deposited on the lower portion of mirror plate 103 and on the surface of electrodes 221 and landing tips 222a and 222b. The lubricants chosen should be thermally stable, low vapor pressure, and non-reactive with metallization and electromechanical materials that formed the micro mirror array devices.

In the embodiment of the presentation invention, fluorocarbon thin film is coated to the surfaces of the lower portion of mirror plate and on the surface of electrodes and landing tips. The SLM device die is exposed to plasma of fluorocarbons, such as CF4, at a substrate temperature of about 200° C. temperatures for less than five minutes. The fluorine on the surfaces 103 serves to prevent adherence or attachment of water to the interfaces of mirror plate and the underneath electrodes and landing tips, which eliminates the impact of humidity in the stiction of mirror during landing operation. Coating fluorocarbon film in the interfaces between the mirror plate 103 and underneath electrodes 221 and landing tips 222a and 222b provides a sufficient repellent performance to water due to the fluorine atoms existing near the exposed surfaces.

In another embodiment of present invention, a perfluoropolyether (PFPE) or a mixture of PFPE or a phosphazine derivative is deposited by PECVD in the interfaces between the mirror plate 103 and underneath electrodes 221 and landing tips 222a and 222b at a substrate temperature of about 200° C. temperatures for less than five minutes. PFPE molecules have an aggregate vapor pressure in the range of $1 \times 10^{-6}$ to $1 \times 10^{-11}$ atm. The thickness of lubricant film is less than 1000 angstroms. To improve the adhesion and lubricating performance on the surface of a metallization or an electromechanical layer, phosphate esters may be chosen because of its affinity with the metallic surface.

Figure 14:
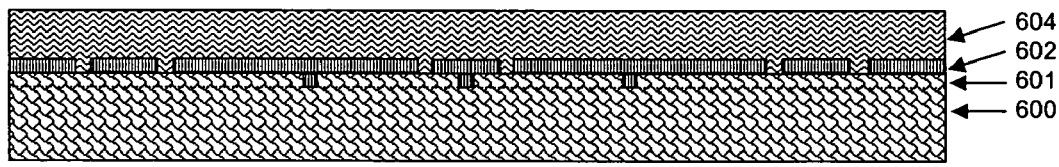
FIGS. 14-16 are cross section side views of a part of a spatial light modulator illustrating one method for fabricating a plurality of support posts, second level electrodes, and landing tips on the surface of control substrate.
Figure 15:
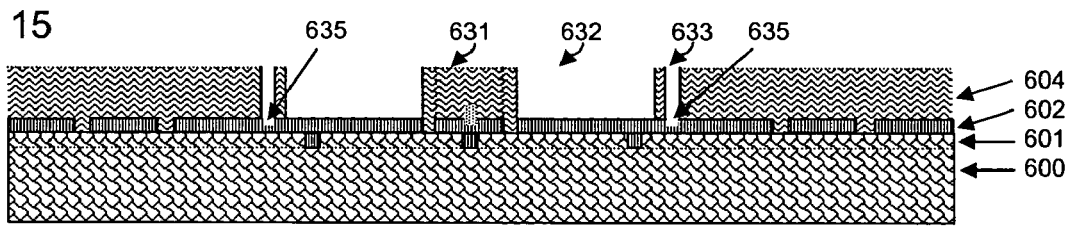
Figure 16:
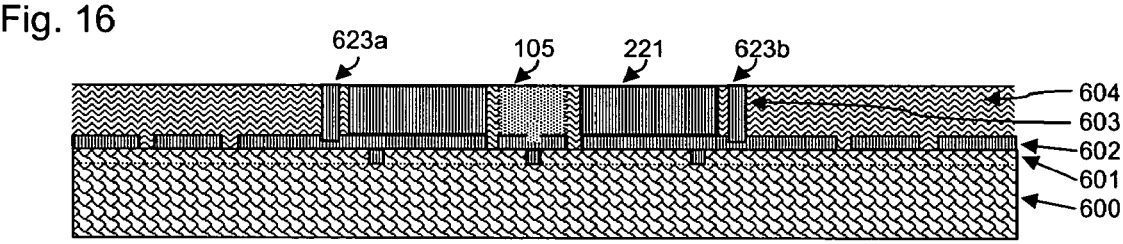

More detail description of each process to fabricate a high contrast spatial light modulator is illustrated in a series of cross section diagrams. FIG. 10 to FIG. 13 are cross section side views of a part of a spatial light modulator illustrating one method for fabricating a plurality of support frames and the first level electrodes connected to the memory cells in the addressing circuitry. FIG. 14 to FIG. 16 are cross section side views of a part of a spatial light modulator illustrating one method for fabricating a plurality of support posts, second level electrodes, and the lower portions of the landing tips on the surface of control substrate.

Figure 17A:
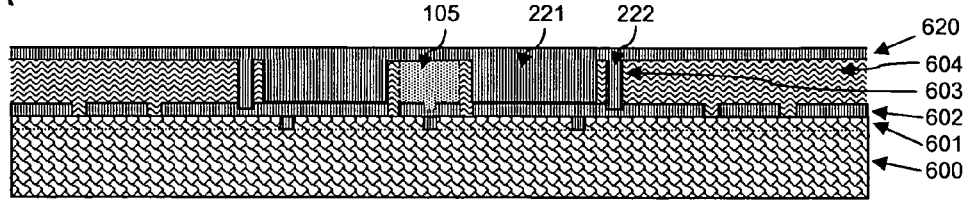
FIG. 17A-17C illustrate the processing steps for fabricating the springy landing tips on the surface of the control substrate.
Figure 17B:
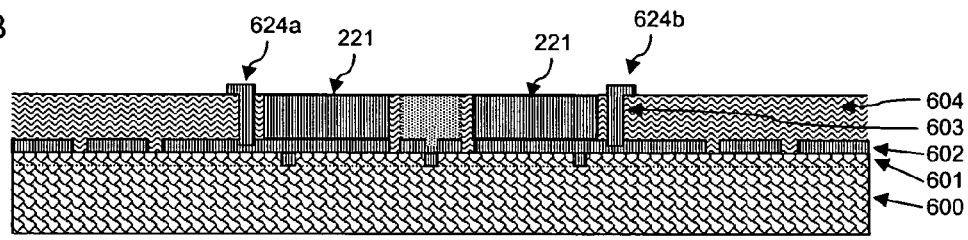
Figure 17C:
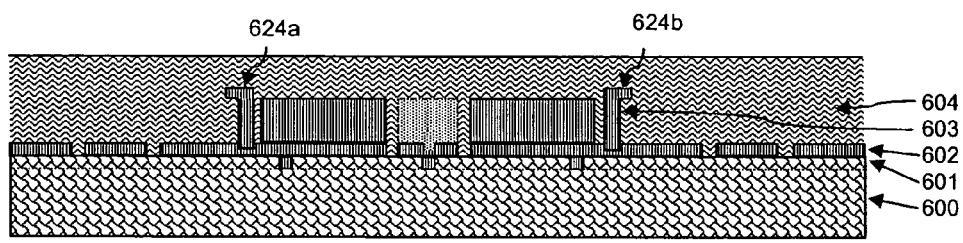

FIGS. 17A-17C illustrate the processing steps for fabricating the springy landing tips on the surface of control substrate. After the electromechanical material is deposited in the via and the recess to form the vertically extended lower portions 623a and 623b and the step electrodes 221 as shown in FIG. 16, the electromechanical material can be continuously deposited to form a layer 620 as shown in FIG. 17A. The layer 620 is then patterned and selectively etched to from the laterally extended upper portions 624a and 624b as shown in FIG. 17B. The laterally extended upper portions 624a and 624b are connected with the vertically extended lower portions 623a and 623b. Since the deposition of the electromechanical material can be continuous from the vertically extended lower portions 623a and 623b to the laterally extended upper portions 624a and 624b, the vertically extended lower portions 623a and 623b to the laterally extended upper portions 624a and 624b can be joined as a unitary body without an interface. The construction of a unitary body enhances the mechanical strength of the springy landing tips 622a and 622b, and thus the robustness of the SLM device 400. A sacrificial material is then deposited over the laterally extended upper portions 624a and 624b, the step electrodes 221, and the previously deposited sacrificial material 604, as shown in FIG. 17C.

The lower surfaces of the laterally extended upper portions 624a and 624b can be at the same level as the top surfaces of the step electrodes 221 for manufacturing simplicity, as shown in the processing steps in FIGS. 17A-17C. It is understood that different fabrication processes are available to produce laterally extended upper portions 624a and 624b having lower surfaces below or above the top surfaces of the step electrodes 221. The choice of the dimensions and positions of the landing tips can be determined by the relatively dimensions of the step electrodes, the mirror plate, and the specified mirror tilt angle in the SLM 400.

The mechanical strength of the landing tips 622a and 622b can also be enhanced when the vertically extended lower portions 623a and 623b and the laterally extended upper portions 624a and 624b comprise different materials. A hole can be etched in the top surface of the vertically extended lower portions 623a or 623b after the formation of the vertically extended lower portions 623a and 623b and the step electrodes 221 by sputtering one electromechanical material as shown in FIG. 16. A second electromechanical material is then deposited to form the layer 620. The deposited second electromechanical material forms a protrusion in the hole in the top surface of the vertically extended lower portions 623a or 623b. After the layer 620 is selectively etched, the laterally extended upper portions 624a and 624b are anchored into the holes on top of the vertically extended lower portions 623a and 623b.

Figure 18A:
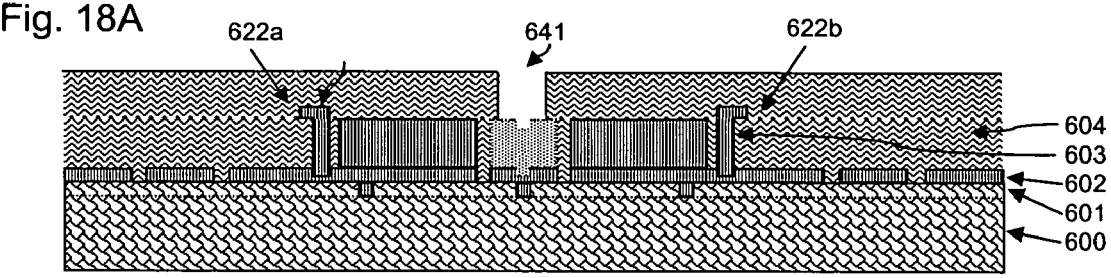
FIGS. 18A-20 are cross section side views of a part of a spatial light modulator illustrating one method for fabricating a plurality of torsion hinges and its supports on the support frame.
Figure 18B:
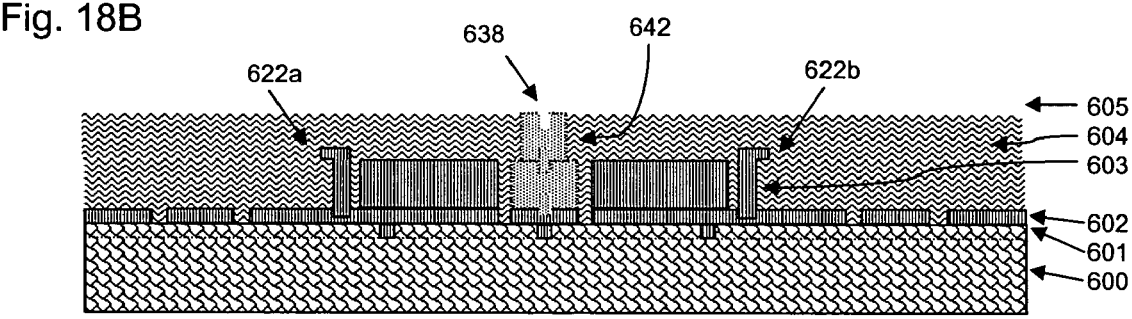
Figure 19:
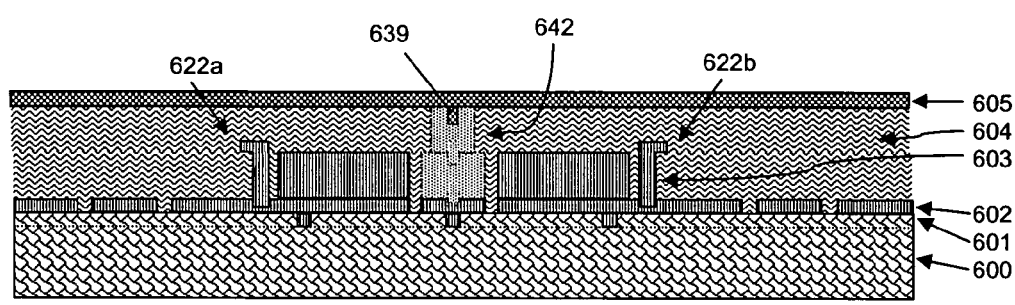
Figure 20:
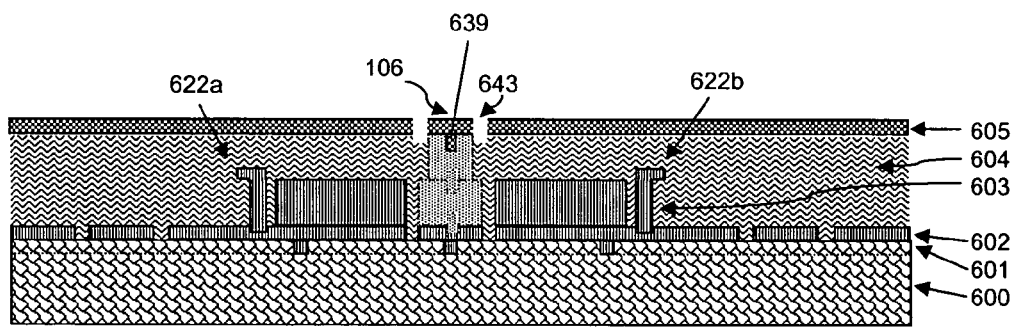

FIG. 18 to FIG. 20 are cross section side views of a part of a spatial light modulator illustrating one method for fabricating a plurality of torsion hinges and its supports on the support frame. FIG. 21 to FIG. 23 are cross section side views of a part of a spatial light modulator illustrating one method for fabricating a mirror plate with a plurality of hidden hinges. FIG. 23 to FIG. 26 are cross section side views of a part of a spatial light modulator illustrating one method for forming the reflective mirrors and releasing individual mirrors of a micro mirror array.

FIG. 10 is a cross sectional view that illustrates the control silicon wafer substrate 600 after using standard CMOS fabrication technology. In one embodiment, the control circuitry in the control substrate includes an array of memory cells, and word-line/bit-line interconnects for communication signals. There are many different methods to make electrical circuitry that performs the addressing function. The DRAM, SRAM, and latch devices commonly known may all perform the addressing function. Since the mirror plate 102 area may be relatively large on semiconductor scales (for example, the mirror plate 102 may have an area of larger then 100 square microns), complex circuitry can be manufactured beneath micro mirror 102. Possible circuitry includes, but is not limited to, storage buffers to store time sequential pixel information, and circuitry to perform pulse width modulation conversions.

In a typical CMOS fabrication process, the control silicon wafer substrate is covered with a passivation layer 601 such as silicon oxide or silicon nitride. The passivated control substrate 600 is patterned and etched anisotropically to form via 621 connected to the word-line/bit-line interconnects in the addressing circuitry, shown in FIG. 11. According to another embodiment of the present invention, anisotropic etching of dielectric materials, such silicon oxides or silicon nitrides, is accomplished with C2F6 and CHF3 based feedstock and their mixtures with He and O2. An exemplified high selectivity dielectric etching process flows C2F6, CHF3, He, and O2 at a ratio of 10:10:5:2 mixtures at a total pressure of 100 mTorr with inductive source power of 1200 watts and a bias power 600 watts. The wafers are then cooled with a backside helium gas flow of 20 sccm at a pressure of 2 torr. A typical silicon oxides etch rate can reach 8000 angstroms per minute.

Next, FIG. 12 shows that an electromechanical layer 602 is deposited by PVD or PECVD depending on the electromechanical materials selected. The electromechanical materials for the electromechanical layer 602 can include one or more of aluminum, silicon, polysilicon, amorphous silicon, alumi-num-silicon alloys, titanium, tantalum, tungsten, and molybdenum. This electromechanical layer 602 is patterned to define hinge support frames 202 and the first level electrodes 221 corresponding to each micro mirror 102, shown in FIG. 12. The patterning electromechanical layer 602 is performed by the following processes. First, a layer of photoresist is spin coated to cover the substrate surface. Then photoresist layer is exposed to standard photolithography and developed to form predetermined patterns. The electromechanical layer is etched anisotropically through to form a plurality of via and openings. Once via and openings are formed, the partially fabricated wafer is cleaned by removing the residues from the surfaces and inside the openings. This is accomplished by exposing the patterned wafer to a 2000 watts of RF or microwave plasma with 2 torr total pressures of a mixture of O2, CF4, and H2O gases at a ratio of 40:1:5 at about 250° C. temperatures for less than five minutes. Finally, the surfaces of electromechanical layer is passivated by exposing to a 2000 watts of RF or microwave plasma with 2 torr pressures of a 3000 sccm of H2O vapor at about 250° C. temperatures for less than three minutes.

Next step is forming a plurality of second level electrodes 221, micro landing tips 222a and 222b, and support pots 105 on the surface of partially fabricated wafer. A micron thick sacrificial material 604 is deposited on the substrate surface, which can be spin coated photoresist or PECVD of organic polymers, shown in FIG. 13. The sacrificial layer 604 is hardened by a series thermal and plasma treatments to transform structure of materials from a hydrophobic state to hydrophilic state of polymers. First, the sacrificial layer 604 is exposed to ultraviolet light, then to a CF4 plasma for about three minutes, followed by baking sacrificial layer at about 150° C. for about two hours before exposing sacrificial layer to oxygen plasma for about one minute. In some case, implanting the sacrificial layer with KeV energy of silicon, boron, or phosphors ions further hardens the sacrificial layers 604.

Then, sacrificial layer 604 is patterned to form a plurality of via and contact openings for second level electrodes 632, micro landing tips 633, and support pots 631 as shown in FIG. 15. The openings 633 for the landing tips can be etched into the electromechanical layer 602 so that the landing tips can be formed anchoring into the substrate as shown in FIGS. 16-26. Similarly, the opening 631 for the support post can also be etched into the substrate layer to allow electromechanical material 603 to be filled to form a support post having a protrusion anchored in the substrate (in this context, the substrate can be considered to include the electromechanical layer 602). In another implementation, the opening can extend entirely through the electromechanical layer 602 and into the substrate 600 itself. In another implementation, the electromechanical layer 602 is absent, and the opening 631 is formed directly in the substrate 600.

To enhance the adhesion for subsequent electromechanical layer, the via and contact openings are exposed to a 2000 watts of RF or microwave plasma with 2 torr total pressures of a mixture of O2, CF4, and H2O gases at a ratio of 40:1:5 at about 250° C. temperatures for less than five minutes. Electromechanical material 603 is then deposited to fill via and contact openings as well as the etched recess area at the base of the landing tips. As a result the landing tips are anchored in the substrate (i.e. the electromechanical layer 602). By providing anchoring in the substrate, the landing tips can be more strongly rooted into the substrate which allows the landing tips to sustain repeated impact from stopping the rotating mirror plates in light-modulation operations. The lower portion of the landing tips are anchored or buried in the substrate. The lower portion of the landing tip can take a tapered shape or can have substantially the same width as the upper portion of the landing tip.

The filling is done by either PECVD or PVD depending on the materials selected. For the materials selected from the group consisting of aluminum, titanium, tungsten, molybdenum, their alloys, PVD is a common deposition method in the semiconductor industry. For the materials selected from the group consisting of silicon, polysilicon, silicide, polycide, tungsten, their combinations, PECVD is chosen as a method of deposition. The partially fabricated wafer is further planarized by CMP to a predetermined thickness slightly less than one micron shown in FIG. 16.

After the CMP planarization, FIG. 17A and B show the deposition of additional electromechanical material, optional planarizing, and subsequent patterning of such materials to form the upper portions (i.e., the lateral extent) of the landing tips. FIG. 17C shows that another layer of sacrificial materials 604 is spin coated on the blanket surface to a predetermined thickness and hardened to form the air gap spacer under the torsion hinges. The sacrificial layer 604 is patterned to form a plurality of via or contact openings for hinge support posts 641 as shown in FIGS. 18A and 18B. A recess region 638 is etched in the top surface of the hinge support post. In FIG. 19, electromechanical material is deposited to fill via and form a torsion hinge layer 605 on the surface. This hinge layer 605 is then planarized by CMP to a predetermined thickness. The thickness of electromechanical layer 605 formed here defines the thickness of torsion hinge bar and the mechanical performance of mirror later on. The partially fabricated wafer is patterned and etched anisotropically to form a plurality of torsion hinges 106 in the electromechanical layers 605 as shown in FIG. 20. As shown in FIG. 20, the torsion hinge 106 includes a protrusion 639 that is anchored in the recess region 638 over the top of the hinge support post. The protrusion 639 strengthens the connection between the torsion hinge 106 and the hinge support post. Durability and reliability of the micro mirror device are significantly increased as a result. As shown in FIGS. 18A through FIG. 26, the hinge support post may include multiple portions stacked up over each other. Each portion can be locked into the portion below by a anchor-hole mechanism as described above.

In summary, the landing tip or the hinge support post can be is formed anchored in the substrate by the following steps: forming a hole in the upper surface of the substrate, depositing a layer of material over the upper surface of the substrate and in the hole of the substrate, selectively removing the deposited or other sacrificial materials over the substrate so that the remainder material will form the upper portion of the landing tip and the hinge support post, and removing or polishing deposited material to flatten the top surface of the material deposited over the substrate. The landing tips and the hinge support posts formed as a result can be substantially upright relative to the substrate.

More sacrificial materials 604 is deposited to fill the openings 643 surrounding each hinges and to form a thin layer 604 with predetermined thickness on the surface, as shown in FIG. 21. The thickness of this layer 604 defines the height of the spacers on top of each torsion hinges 106. The sacrificial layer 604 is then patterned to form a plurality of spacers on top of each torsion hinges 106, as shown in FIG. 22. Since the top surfaces of support posts 642 are also under the cavities as lower part of the mirror plate 103, the air gap G in the cavity needs to be high enough to accommodate the angular rotation of mirror plate 103 without touching the larger hinge support posts 105 at a pre-determined angle θ. In order for the mirror to rotate a pre-determined angle θ without touching the hinge support post 105, the air gap of the cavities where torsion hinges 106 are positioned must be larger than G=0.5×W×SIN (θ), where W is the cross section width of hinge support posts 105. In the present invention, each mirror in the array may rotate 15° in each direction. The calculation indicates the air gap spacing G of torsion hinge 106 in the cavity must be larger than G=0.13 W. If width of each side W of a square shape hinge support post 105 is 1.0 micron, the air gap spacing G in the cavity should be larger than 0.13 microns.

To form a mirror with torsion hinges 106 under each cavities in the lower portion of mirror plate103, more electromechanical materials 605 is deposited to cover a plurality of sacrificial spacers, as shown in FIG. 23. In some cases, a chemical-mechanical-polished (CMP) process is added to ensure a flat reflective surface of electromechanical layer 605 has been achieved before etching to form individual mirrors. The thickness of the total electromechanical layer 605 will ultimately be the approximate thickness of the mirror plate 103 eventually fabricated. In FIG. 23, surface of partially fabricated wafer is planarized by CMP to a predetermined thickness of mirror plate 103. In present invention, the thickness of mirror plate 605 is between 0.3 microns to 0.5 microns. If the electromechanical material is aluminum or its metallic alloy, the reflectivity of mirror is high enough for most of display applications. For some other electromechanical materials or for other applications, reflectivity of mirror surface may be enhanced by deposition of a reflective layer 606 of 400 angstroms or less thickness selected from the group consisting of aluminum, gold, their alloys, and combinations, as shown in FIG. 24. The reflective surface 606 of electromechanical layer is then patterned and etched anisotropically through to form a plurality of individual mirrors, as shown in FIG. 25.

FIG. 26 shows the remaining sacrificial materials 604 are removed and residues are cleaned through a plurality of air gaps between each individual mirrors in the array to form a functional micro mirror array based spatial light modulator. In a real manufacturing environment, more processes are required before delivering a functional spatial light modulator for video display application. After reflective surface 606 of electromechanical layer 605 is patterned and etched anisotropically through to form a plurality of individual mirrors, more sacrificial materials 604 are deposited to cover the surface of fabricated wafer. With its surface protected by a layer of sacrificial layer 604, fabricated wafer is going through common semiconductor packaging processes to form individual device dies. In a packaging process, fabricated wafer is partially sawed (step 881) before separating into individual dies by scribing and breaking (step 882). The spatial light modulator device die is attached to the chip base with wire bonds and interconnects (step 883) before striping the remaining sacrificial materials 604 and its residues in the structures (step 884). The cleaning is accomplished by exposing the patterned wafer to 2000 watts of RF or microwave plasma with 2 torr total pressures of a mixture of O2, CF4, and H2O gases at a ratio of 40:1:5 at about 250° C. temperatures for less than five minutes. Finally, the surfaces of electromechanical and metallization structures are passivated by exposing to a 2000 watts of RF or microwave plasma with 2 torr pressures of a 3000 sccm of H2O vapor at about 250° C. temperatures for less than three minutes.

The SLM device die is further coated a anti-stiction layer inside the opening structures by exposing to a PECVD of fluorocarbon at about 200° C. temperatures for less than five minutes (step 885) before plasma cleaning and electro-optical functional test (step 886). Finally, the SLM device is hermetically sealed with a glass window lip (step 887) and sent to burn-in process for reliability and robust quality control (step 888).

Although the invention has been particularly shown and described with reference to multiple embodiments, it will be understood by persons skilled in the relevant art that various changes in form and details can be made therein without departing from the spirit and scope of the invention. For example, the same 3-dimensional multi-layer structures may be constructed by patterning and etching the electromechanical layers, rather than patterning the sacrificial layers and etching via. Furthermore, the disclosed SLM device can include a single landing tip joined to the substrate for stopping the rotation of a mirror plate. As described above, the mirror plate can be rotated by an electrostatic force toward the landing tip. The landing tip can come to contact with the lower surface of the mirror plate to stop its rotation. The orientation of the mirror plate when it is in contact with the landing tip defines one angular position of the mirror plate for light modulation. The contact between the landing tip and the mirror plate stores an elastic energy in the bent landing tip. The mirror plate can be rotated away from the landing tip by another electrostatic force. The release of the elastic force from the bent landing tip helps to overcome the contact stiction between the landing tip and the mirror plate. The mirror plate can be tilted to the horizontal direction or another angular direction, which defines a second state of light modulation by the mirror plate.

What is claimed is:

1. A spatial light modulator, comprising:
   a mirror plate comprising a reflective upper surface, a lower surface, and a recess in the lower surface;
   a substrate comprising an upper surface;
   a hinge support post in connection with the upper surface, and a hinge component supported by the hinge support post and in connection with the mirror plate, wherein the hinge component extends into the recess and is configured to facilitate a rotation of the mirror plate; and
   a landing tip having a laterally extended upper portion and a vertically extended lower portion in connection with the substrate, wherein the laterally extended upper portion is configured to contact the lower surface of the mirror plate to limit the rotation of the mirror plate, wherein the laterally extended upper portion includes a protrusion that is anchored in a hole in a top surface of the vertically extended lower portion of the landing tip.

2. The spatial light modulator of claim 1, wherein the vertically extended lower portion comprises substantially the same material composition as the laterally extended upper portion.

3. The spatial light modulator of claim 1, wherein the vertically extended lower portion comprises a different material than the laterally extended upper portion.

4. The spatial light modulator of claim 1, wherein the landing tip comprises at least one material selected from the group consisting of silicon, aluminum, titanium, tantalum, tungsten, and molybdenum.

5. The spatial light modulator of claim 1, further comprising a plurality of landing tips each having a laterally extended upper portion and a vertically extended lower portion in connection with the substrate, wherein the laterally extended upper portion is configured to contact the lower surface of the mirror plate to limit the rotation of the mirror plate at a predetermined mirror-plate orientation.

6. The spatial light modulator of claim 1, wherein both the laterally extended upper portion and the vertically extended lower portion are configured to bend when the mirror plate contacts the landing tip.

7. The spatial light modulator of claim 1, further comprising a bias electrode in electrical communication with the mirror plate and the landing tip.

8. A spatial light modulator, comprising:
   a mirror plate comprising a reflective upper surface, a lower surface, and recess in the lower surface;
   a substrate comprising an upper surface, a hinge support post in connection with the upper surface, and a hinge component supported by the hinge support post and in connection with the mirror plate, wherein the hinge component extends into the recess and is configured to facilitate a rotation of the mirror plate; and
   a landing tip having a laterally extended upper portion and a vertically extended lower portion in connection with the substrate, wherein the laterally extended upper portion extends in at least one direction outside the upper end of the vertically extended lower portion, and wherein the laterally extended upper portion is configured to contact the lower surface of the mirror plate to limit the rotation of the mirror plate, wherein the laterally extended upper portion includes a protrusion that is anchored in a hole in a top surface of the vertically extended lower portion of the landing tip.

9. The spatial light modulator of claim 8, wherein the vertically extended lower portion comprises substantially the same material composition as the laterally extended upper portion.

10. The spatial light modulator of claim 8, wherein the vertically extended lower portion comprises a different material than the laterally extended upper portion.

* * * * *

UNITED STATES PATENT AND TRADEMARK OFFICE
CERTIFICATE OF CORRECTION

PATENT NO. : 7,443,572 B2
APPLICATION NO. : 11/297162
DATED : October 28, 2008
INVENTOR(S) : Shaoher X. Pan, Vlad Novotny and Xuchun Liu It is certified that error appears in the above-identified patent and that said Letters Patent is hereby corrected as shown below:

Column 6, Lines 60 and 61; replace:
 "voltages Vb on the lower surface of mirror plate 103aand 103bhas less impact on which direction the mirror 102 will" with
 -- voltages Vb on the lower surface of mirror plate 103a and 103b has less impact on which direction the mirror 102 will --

Column 6, Lines 65-66; replace:
 "deformed mirror hinges 106 and deformed the springy landing tips 222aor 222b. After a bipo-" with
 -- deformed mirror hinges 106 and deformed the springy landing tips 222a or 222b. After a bipo- --

Column 7, Line 1; replace:
 "energy of deformed springy landing tip 222aor 222band" with
 -- energy of deformed springy landing tip 222a or 222b and --

Column 7, Line 4; replace:
 "springy landing tips 222aor 222b. This perturbation of mirror" with
 -- springy landing tips 222a or 222b. This perturbation of mirror --

Column 7, Line 36; replace:
 "cal materials, will cover both the stiffness of mirror plate 103" with
 -- cal materials, will cover both the stiffness of mirror plate 103 --

Column 7, Line 67; replace:
 "their suicides, and their alloys. Refractory metal and their" with
 -- their silicides, and their alloys. Refractory metal and their --

Column 8, Line 65; replace:
 "The periodic array of the straight or comer shape edges of" with
 -- The periodic array of the straight or corner shape edges of --

UNITED STATES PATENT AND TRADEMARK OFFICE
CERTIFICATE OF CORRECTION

PATENT NO. : 7,443,572 B2  
APPLICATION NO. : 11/297162  
DATED : October 28, 2008  
INVENTOR(S) : Shaoher X. Pan, Vlad Novotny and Xuchun Liu It is certified that error appears in the above-identified patent and that said Letters Patent is hereby corrected as shown below:

Column 9, Line 9; replace:
"comer shape edges of a rectangular shape mirror with at least" with
-- corner shape edges of a rectangular shape mirror with at least --

Signed and Sealed this

Sixth Day of January, 2009

JON W. DUDAS  
*Director of the United States Patent and Trademark Office*